United States Patent [19]

Potash

[11] 4,393,465

[45] Jul. 12, 1983

[54] DIGITAL DEVICE FOR TIME-MULTIPLEXING MULTIPLE TASKS

[75] Inventor: Hanan Potash, La Jolla, Calif.

[73] Assignee: Burroughs Corporation, Detroit, Mich.

[21] Appl. No.: 253,717

[22] Filed: Apr. 13, 1981

[51] Int. Cl.³ .............................................. G06F 3/04
[52] U.S. Cl. .................................................. 364/900
[58] Field of Search ... 364/200 MS File, 900 MS File; 370/92, 93, 94

[56] References Cited

U.S. PATENT DOCUMENTS

| | | | |
|---|---|---|---|
| 3,774,163 | 11/1973 | Recoque | 364/200 |
| 3,790,717 | 2/1974 | Abramson et al. | 370/92 X |
| 4,109,311 | 8/1978 | Blum et al. | 364/200 |

*Primary Examiner*—Harvey E. Springborn

*Attorney, Agent, or Firm*—Charles J. Fassbender; Kevin R. Peterson; J. Ronald Richebourg

[57] ABSTRACT

A digital device time-multiplexes the execution of multiple tasks that are defined by respective sequences of control words in a control memory. In this device, the time-multiplexing is performed by sending control signals that are representative of respective resume addresses along with each output message sent by the device that calls for a response. These response messages are thereafter received by the device along with the control signals that were sent with the corresponding output message. Received response messages are thereafter operated on by the device by executing control words in the control memory beginning at the resume address represented by the received control signals.

10 Claims, 7 Drawing Figures

DIGITAL DEVICE FOR TIME-MULTIPLEXING MULTIPLE TASKS

BACKGROUND OF THE INVENTION

This invention relates to digital computers; and more particularly to microprogrammed digital computers for time-multiplexing multiple tasks.

By a microprogrammed digital computer is herein meant a digital computer that is constructed in the Wilkes' sense. That is, the computer includes a control memory that stores a plurality of control words; and those control words are sequentially read from the control memory to direct the operation of the computer's logic gates. This is discussed, for example, in a paper titled "Microprogramming: A Tutorial and Survey of Recent Developments" by Tomlinson G. Rauscher and Phillip M. Adams, *IEEE Transactions on Computers*, Volume C-29, No. 1, January, 1980, pp. 2-5.

Typically, control words in the control memory are arranged into a plurality of groups; and each of those groups performs a particular function. For example, one particular grouping of control words might perform a multiply operation; another grouping of control words might perform a divide operation; etc. These groupings of control words are herein called tasks.

Now the present invention is directed to the time sequence in which the various tasks in a control memory are performed. In the prior art, for example, these tasks are often performed one-at-a-time in a serial fashion. In that case, once a particular task is started, only control words from that task are executed until the task is complete; and only then can another task be started.

But a problem with serially executing tasks is that the computer's operation is usually quite inefficient. Suppose for example that one control word in a particular task operates to send a message that calls for a response message to be sent back. Specifically, the sent message might be a request for data from an external memory, with the response message being the memory data. Now suppose that the next control word in that task operates on that response message. Then if the response takes a relatively long time to be generated and received, the computer must wait and do nothing between the time that it calls for the response message and the time when the response message is actually received.

In order to overcome this problem, multiple tasks can be performed by the computer in some time-multiplexed fashion such that the computer is never merely waiting for a response message. But time-multiplexing tasks in a control memory presents a new set of problems. In particular, some means must be provided for keeping tract of the number of tasks that are simultaneously being executed and for restarting those tasks which were previously stopped. Also, the time that it takes to perform these bookkeeping operations must be minimized so that the time that it takes to switch tasks does not take longer than the time that it takes to receive a called-for response message.

Accordingly, it is a primary object of this invention to provide a digital device having improved time-multiplexing capabilities.

Another object of this invention is to provide a digital device which time-multiplexes multiple tasks with improved efficiency.

BRIEF SUMMARY OF THE INVENTION

These and other objectives are accomplished in accordance with the invention by a digital device for time-multiplexing the execution of multiple tasks that are defined by respective sequences of control words in a control memory. In this device, the time-multiplexing is performed by sending control signals that are representative of respective resume addresses along with each output message sent by the device that calls for a response. These response messages are thereafter received by the device along with the corresponding respective resume addresses. Response messages received by the device are thereafter operated on in the device by executing control words in the control memory beginning at the corresponding resume address.

BRIEF DESCRIPTION OF THE DRAWINGS

Various features and advantages of the invention will best be understood by reference to the following detailed description and accompanying drawings wherein.

DETAILED DESCRIPTION OF THE INVENTION

Figure 1:
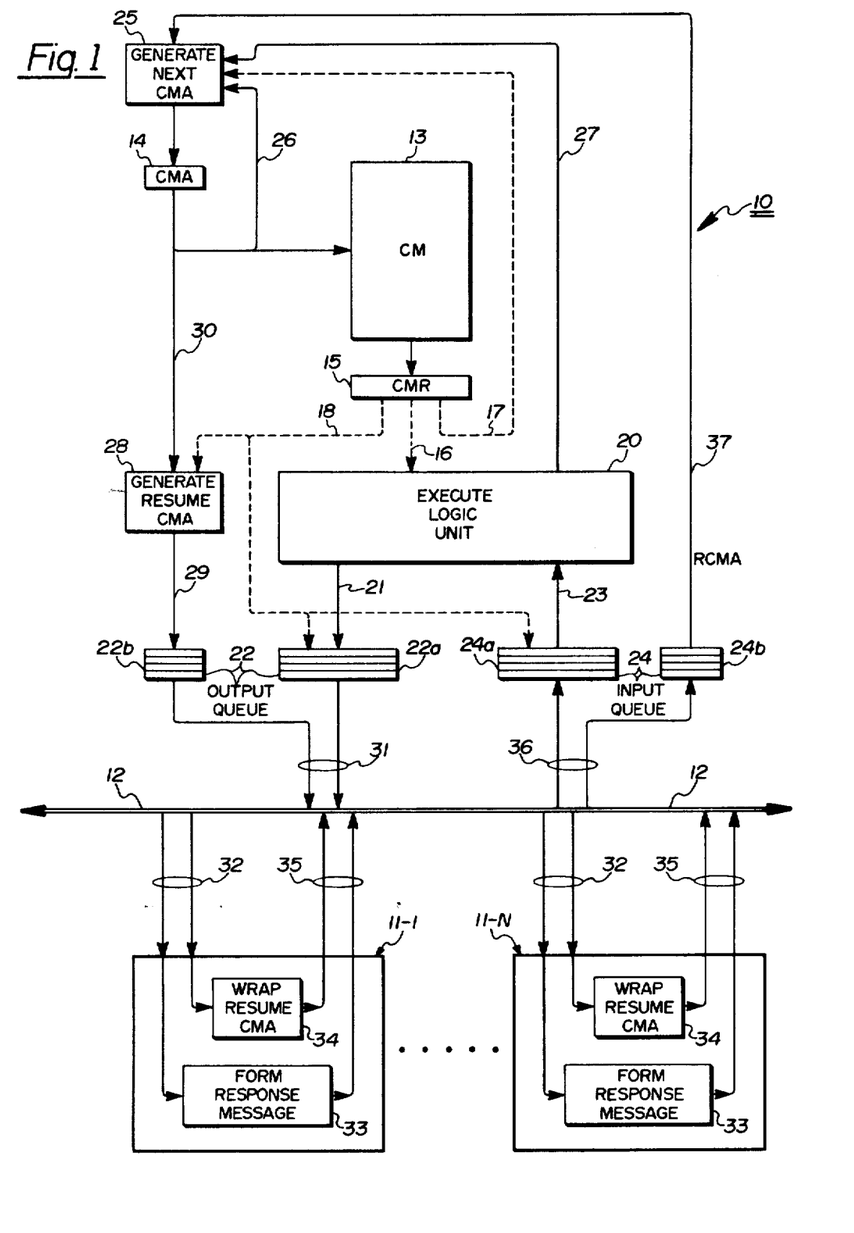
FIG. 1 illustrates one preferred embodiment of a digital system constructed according to the invention.

Referring now to FIG. 1, the details of one preferred digital system that is constructed according to the invention will be described. This system includes a plurality of digital devices 10, 11-1, . . . , 11-N. In operation, device 10 sends messages over a bus 12 to the devices 11-1 through 11-N. Some of these messages call for response messages; and those responses are sent by devices 11-1 through 11-N on bus 12 to device 10. Devices 11-1 through 11-N can also send unsolicited non-response messages on bus 12 to device 10.

Included within device 10 is a control memory 13; and this control memory contains a plurality of control words which direct the device's operation. Those control words are partitioned into several groups with each group defining a particular task for the device to perform. Some of these tasks include sending the above-described messages and operating on the corresponding responses. In the present invention, several of these tasks are performed in a novel time-multiplexed fashion.

To fetch a control word in any particular task, a control memory address register 14 is provided. Each control word addressed by register 14 is read from memory 13 and is stored in a control memory register 15. Then various portions of the control word in register 15 are sent on lines 16, 17, and 18 to direct the operation of device 10 for one cycle.

Signals on lines 16 direct the operation of an execute logic unit 20. Unit 20 forms the output messages on lines 21 for an output queue 22, receives the called for response messages on lines 23 from an input queue 24, and performs arithmetic and logical operations on those input messages. All of these operations occur sequentially in response to the control signals on lines 16 from several control words.

Signals on lines 17 are sent to a next address logic unit 25; and unit 25 operates in response to those signals to generate the address of the next control word to be executed. That address may be generated relative to the present control memory address; and thus the present control memory address is sent to unit 25 on leads 26. Also, the next address may have one value or another depending upon conditions in the execute logic unit 20; and thus various conditions are sent on leads 27 to logic unit 25. Unit 25 also receives input signals from the input queue 24, the function of which will be explained shortly.

Signals on leads 18 are sent to the queues 22 and 24, and to another logic unit 28. Unit 28 operates in response to those signals to generate another control memory address on lines 29 called a resume address. This resume address is loaded into output queue 22 whenever the signals on leads 18 indicate that the output message is calling for a response message. That is, each output message that is sent which calls for a response message has a corresponding resume address. And the resume address identifies the first control word that is to be executed when the response message is operated upon.

Under the direction of the signals on leads 18, the resume address may be generated relative to the present control memory address. Thus, the present control memory address is sent to logic unit 28 on leads 30. Also under the direction of control signals on leads 18, the resume address may be any selectable location in memory 13 without regard to the present control memory address; and thus a literal is sent on leads 18 to logic unit 28.

After an output message calling for a response message and its corresponding resume address have been loaded into output queue 22, that message and resume address are sent on output lines 31 to bus 12. And from there, the output message and corresponding resume address are selectively received by one of the devices 11-1 through 11-N on input lines 32.

Each of those devices includes a logic unit 33 which forms the called for response message. And each of those devices also includes a logic unit 34 which holds the resume address that it received. Then after the response message is formed, that response along with the resume address and a control bit indicating the presence of a resume address is sent on output lines 35 to bus 12.

From bus 12, the response message along with its corresponding resume address and control bit are received on input lines 36 and loaded into input queue 24. And from there, the resume address along with the control bit is sent on lines 37 to logic unit 25. Then when device 10 is ready to operate on a message from input queue 22, logic unit 25 examines the control bit on lines 37 to determine if that message is a solicited response message or an unsolicited message.

If the input message is an unsolicited nonresponse message, logic unit 25 loads a fixed address into register 14. But if the input message is a response message, then logic unit 25 transfers the resume address on lines 37 to the control memory address register 14. Consequently, the first control word to actually operate on the input message from input queue 22 is that control word which was previously selected by logic unit 28 when the corresponding output message was sent.

Note that in the system as described above, the order in which the output messages are sent is entirely unrelated to the order in which the corresponding input messages are received. This is evident by considering the exemplary case where devices 11-1 through 11-N are memories which operate at different speeds, and where the output messages are requests for data from those memories.

Also, the order of the input messages will be scrambled from the order of the output messages because the devices 11-1 through 11-N can send unsolicited nonresponse messages to device 10. This may occur, for example, where one of the devices 11-1 through 11-N is an operator's console, and the operator is requesting device 10 to begin performance of one of the above-mentioned tasks.

Figure 2:
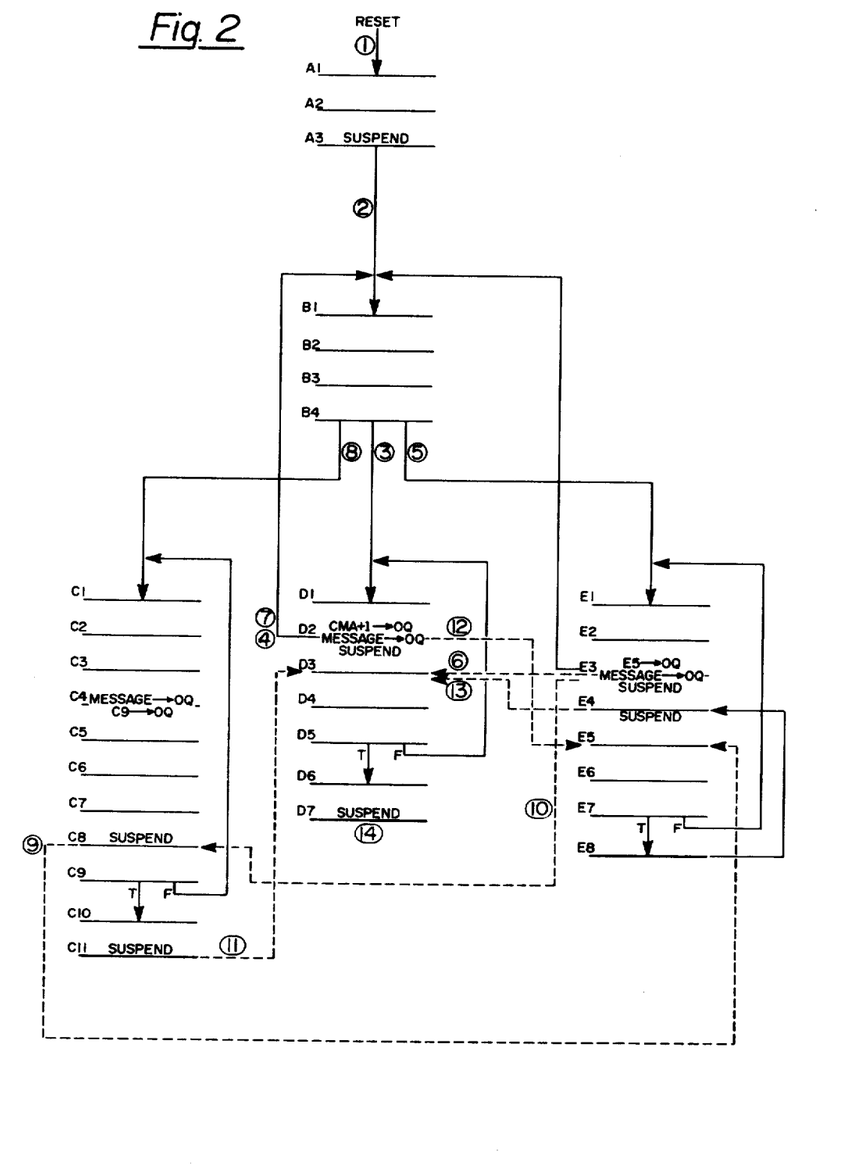
FIG. 2 illustrates some of the tasks within the control memory of device 10 in FIG. 1, and illustrates an exemplary time-multiplexing of those tasks.

Reference should now be made to FIG. 2 which illustrates an example of how device 10 time-multiplexes the execution of multiple tasks. Five tasks are identified in this example by reference numerals A1-A3, B1-B4, C1-C11, D1-D7, and E1-E8. Reference numeral A1 identifies the first control word in task A; reference numeral A2 identifies the second control word in task A; reference numeral B1 identifies the first control word in task B; etc.

Initially, as indicated by the encircled No. 1, device 10 executes control words A1 through A3 in task A. This occurs right after device 10 is powered on; and the function of this task is to set device 10 into a predetermined initial state. Then, after the execution of control word A3, device 10 suspends further operation until a message is received in input queue 24. This suspension occurs under the direction of a bit in control word A3.

Thereafter, one of the devices 11-1 through 11-N eventually sends an unsolicited message to device 10 telling it to perform a particular task. This message is detected by logic unit 25 as being an unsolicited message; and thus it generates the fixed address of control word B1. This is indicated by the encircled No. 2. Control words B1 through B4 are then executed; and their function is to read and analyze unsolicited messages from input queue 24.

Based on this analysis, device 1C then branches to the particular task that it is asked to perform. Suppose in this example that the unsolicited message requested task D to be performed. Then a branch is made from control word B4 to control word D1 as indicated by the encircled No. 3.

Control words in task D are then executed until one of those control words sends an output message to output queue 22 which calls for a corresponding response message. When that occurs, device 10 suspends further operation until a message is received by the input queue. This is illustrated as occurring in response to control word D2 which loads an output message into output queue 22a, loads the present control memory address plus one into output queue 22b as the resume address, and suspends operations.

Assume now that during the execution of control words B1-B4 and D1-D2, another unsolicited message was received by input queue 24. Under that condition, logic unit 25 again regenerates the fixed address of control word B1. This is indicated by the encircled No. 4.

Task B then analyzes this second unsolicited message to determine the task which it is requesting device 10 to do. Suppose in this example that it requests task E. Then device 10 branches from control word B4 to control word E1 as indicated by the encircled No. 5.

Control words in task E are then executed until one of them sends an output message to the output queue which calls for a corresponding response message. This is illustrated as occurring in control word E3. That control word generates the address of control word E5 as the resume address and sends it to output queue 22b, sends an output message to output queue 22a, and suspends.

Now assume that when control word E5 is being executed, the response message that was called for in control word D2 has already been received by the input queue. Under that condition and in response to the suspend signal, logic unit 25 executes control word D3 immediately after executing control word E3. This is indicated by the encircled No. 6.

This branch from control word E3 to control word D3 is possible because each response message has a resume address associated with it. And this resume address is transferred from input queue 24b to address register 14 by logic unit 25 when it detects the concurrence of a suspend signal and a response message in the input queue. Note that in FIG. 2, all branches taken by a resume address are indicated by dashed lines; while any other branches are indicated as solid lines.

Device 10 then executes control words D3 through D5 whereupon a conditional branch is taken. Suppose in this example that the condition is false, in which case device 10 then executes control words D1 and D2. Then in control word D2, device 10 again sends a resume address and an output message which calls for a response and suspends further operation.

Next assume that at the time when control word D2 is executed, another unsolicited message had previously been received in the input queue. Under that condition, logic unit 25 branches to control word B1 to analyze the unsolicited message. This analysis is performed by control words B1 through B4. Then if that message calls for task C to be executed, a branch is taken from control word B4 to control word C1, as is indicated by the encircled No. 8.

Following through the flow of task C, device 10 executes control words C1 through C8 and then suspends operations. Note that control word C4 sent an output message calling for a response and generated address C9 as the resume address. But operations were not suspended in control word C4 because the task could perform further operations without the response message until it reached control word C9.

Assume now that upon the execution of control word C8 the response that was previously requested in task E has been received. Thus a branch is taken directly from control word C8 to control word E5. This is indicated by the encircled No. 9.

Control words E5 through E7 then operate on the received response whereupon a conditional branch is taken. Assume that the condition tested is false, and thus control words E1 through E3 are executed. Then if upon the execution of control word E3 the message called for in control word C4 has been received, a branch is taken directly from that control word to control word C8. This is indicated by the encircled No. 10.

Control words C8 and C9 then operate on the received response. Then if the test in control word C9 is true, control words C10 and C11 are executed. That completes the total execution of task C; and so control word C11 suspends operation.

Then if the message called for in task D is at the top of input queue 24, a branch is taken directly from control word C11 to control word D3. This is indicated by the encircled No. 11. Control words D3 through D5 are then executed; and a conditional branch is made in control word D5. If the condition tested is false, control words D1 and D2 are then executed. Control word D2 sends another output message calling for a response and suspends.

Next, if the response called for in task E is at the top of the input queue 24, a branch is taken directly from control word D2 to control word E5. This is indicated by the encircled No. 12. Then control words E5 through E7 are executed and another conditional branch is taken. Suppose this time that the condition tested is true, in which case control words E8 and E4 are executed. This completes the performance of task E; and thus control word E4 suspends operations.

Then if the response called for in task D is at the top of input queue 24, a branch is taken directly from control word E4 to control word D3. This is indicated by the encircled No. 13. Then control words D3 through D5 are executed, whereupon a conditional branch is taken. Assuming that the condition tested is true, control words D6 and D7 are then executed which completes the execution of task D. Thus control word D7 suspends operations.

Device 10 then stays in the suspended state until it is again requested via an unsolicited message to perform another task. When that occurs it will first branch to control word B1 to analyze the unsolicited message, and then branch to the requested task as described above.

One point that should be evident from the above described example is that device 10 is there time-multiplexing the execution of three different tasks, C, D, and E. But the number of tasks which device 10 is capable of time-multiplexing is of course not limited to three. That number is much larger and is limited only by the storage capacity of the logic units 34 in the devices 11-1 through 11-N. Thus it is readily possible for device 10 to time-multiplex the execution of hundreds of tasks.

Another point that should be evident from the above example is that device 10 substantially increases its performance by switching from one task to another task at the point in the first task where the response message is needed to continue. Devices 11-1 through 11-N of course need some time to generate the called for response message. Thus, if device 10 did not switch tasks it would have to wait and do nothing until it received the called for response. And this waiting would substantially decrease its performance.

Still another point which should be evident from the above example is that performance is further increased due to the fact that each output message which calls for a response has a resume address associated with it. Thus, when the response message is received, device 10 does not have to branch to a fixed routine, such as control words B1 through B4, to determine what this message is and from there jump to the particular task which called for the response message. Instead, the concurrence of a suspend signal and a response message in the input queue causes device 10 to jump directly to the first control word that is to actually operate on the response.

Figure 3:
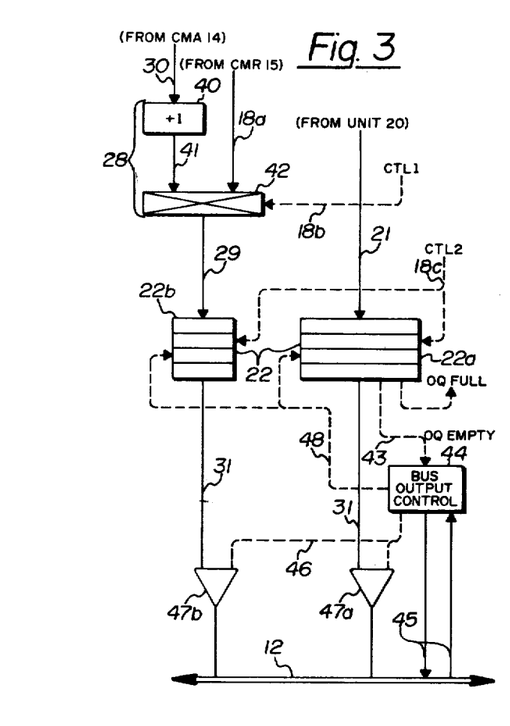
FIG. 3 is a detailed logic diagram of that portion of device 10 in FIG. 1 that is associated with sending output messages calling for response messages.

Turning now to FIG. 3, that portion of device 10 which is associated with sending output messages and resume addresses to bus 12 will be described in greater detail. In that FIG. 3, data paths are indicated by solid lines, while control signal paths are indicated by dashed lines. Also, those portions of the data paths which were previously described in conjunction with FIG. 1 are identified by like reference numerals.

Consider first logic unit 28 which generates the resume address. It includes an adder 40 which adds one to the present control memory address on lines 30. Outputs from adder 40 then connect via lines 41 to a 2×1 multiplexer 42. A literal on lines 18a from control memory register 15 forms a second input to multiplexer 42.

Addresses on lines 18a and 41 are selectively passed through multiplexer 42 to lines 29 in response to a control signal CTL1 on a line 18b. Lines 18a-18d form the lines 18 in FIG. 1 from control register 15. From multiplexer 42, the resume address is unloaded into output queue 22b in response to that control signal, the output message from unit 20 is loaded into output queue 22a; and a signal OQEMPTY on a line 43 from the output queue goes false.

Signal OQEMPTY is received by an output bus control unit 44. That unit synchronizes the sending of data from output queue 22 to bus 12. Whenever the output queue is not empty, unit 44 makes requests to use bus 12 and obtains its use by signals on lines 45. Then when the bus is obtained, unit 44 sends a signal on a lead 46 which gates the output message and resume address through transmitters 47a and 47b onto bus 12. Thereafter, unit 44 sends a signal on a line 48 which enables the next output message to be removed from the output queue.

Next, turning to FIG. 4, that portion of device 10 which is associated with receiving messages in input queue 24 will be described in greater detail. Again in this FIG. 4, data paths are indicated by solid lines, control signal paths are indicated by dashed lines, and parts which were previously described in conjunction with FIG. 1 are identified by like reference numerals.

Figure 4:
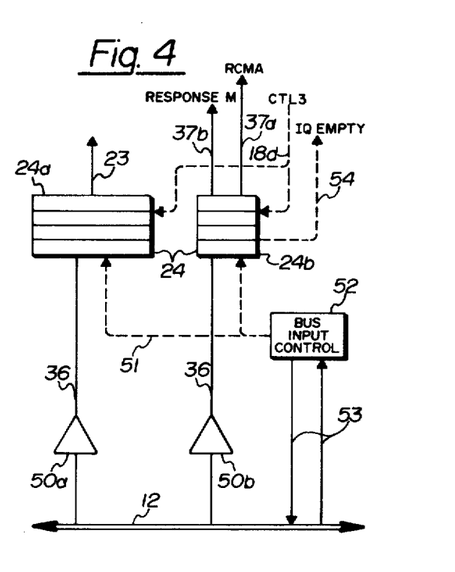
FIG. 4 is a detailed logic diagram of that portion of device 10 in FIG. 1 that is associated with receiving called-for response messages.

As illustrated in FIG. 4, input messages on bus 12 are passed through receivers 50a to input queue 24a. If a resume address and control bit indicating the presence of a resume address accompany the input message, they are sent through receivers 50b to input queue 24b. Any actual loading of the input queue occurs in response to a control signal on a line 51 which is provided by an input bus control unit 52. Unit 52 generates this load signal in response to control signals on lines 53 from bus 12.

Whenever output queue 24 contains a message, it forces a control signal IQEMPTY on a lead 54 to go false. This control signal is then utilized by device 10 to generate control memory addresses as will be described shortly in conjunction with FIG. 5. The resume memory address RCMA on lines 37a and the control signal RESPONSEM, which indicates that a response message is present, are also utilized in forming this control memory address. Then after the appropriate task takes the message from the output queue, a control signal CTL3 on line 18d enables the next message to be removed from the queue.

Considering now FIG. 5, the details of logic unit 25 which generates the next control memory address will be described. That unit includes a plurality of AND-OR logic gates 60 which receive test conditions on the leads 27 and control signals on the leads 117a. These control signals select one of the test conditions; and the state of the selected condition is generated on a lead 61.

Lead 61 forms the control input to a 2×1 multiplexer 62. When the signal on lead 61 is true, multiplexer 62 passes the present control memory address CMA plus one on leads 63 to its outputs 64; and when the signal on lead 61 is false, multiplexer 62 passes a branch address on leads 17b to its outputs 64. The address on leads 64 is then passed to the input of control memory address register 14 in response to a control signal on a lead 17c.

Figure 5:
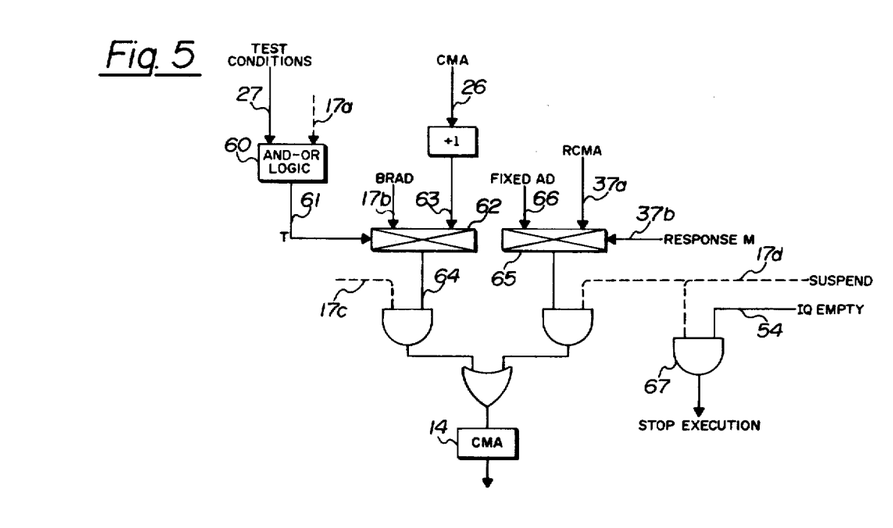
FIG. 5 is a detailed logic diagram of that portion of device 10 in FIG. 1 that is associated with generating control memory addresses.

The remaining logic in FIG. 5 generates addresses for register 14 in a response to the SUSPEND signal. That signal comes from the control memory register on a lead 17d. When the SUSPEND signal is true, an address from a multiplexer 65 is sent to control memory address register 14. And the address which multiplexer 65 sends is dependent upon the control signal RESPONSEM on lead 37b which indicates whether or not a response message is in the input queue. When signal RESPONSEM is true, multiplexer 65 passes the resume control memory address RCMA on leads 37a to its output; and when that signal is false, multiplexer 65 passes the fixed address of control word B1 on leads 66 to its output.

Also as has been described above, it is possible for input queue 24 to be empty when a control word causes the SUSPEND signal to come true. This will occur, for example, after the initialization control words A1-A3 have been executed; and it can occur when device 10 sends an output message calling for a response which takes a relatively long time to generate. Accordingly, an AND gate 67 senses for the concurrence of the SUSPEND signal and the IQEMPTY signal on leads 17b and 54 respectively. And whenever the output of gate 67 is true, the execution of control words is stopped until an input message is received as indicated by the false state of IQEMPTY.

Figure 6:
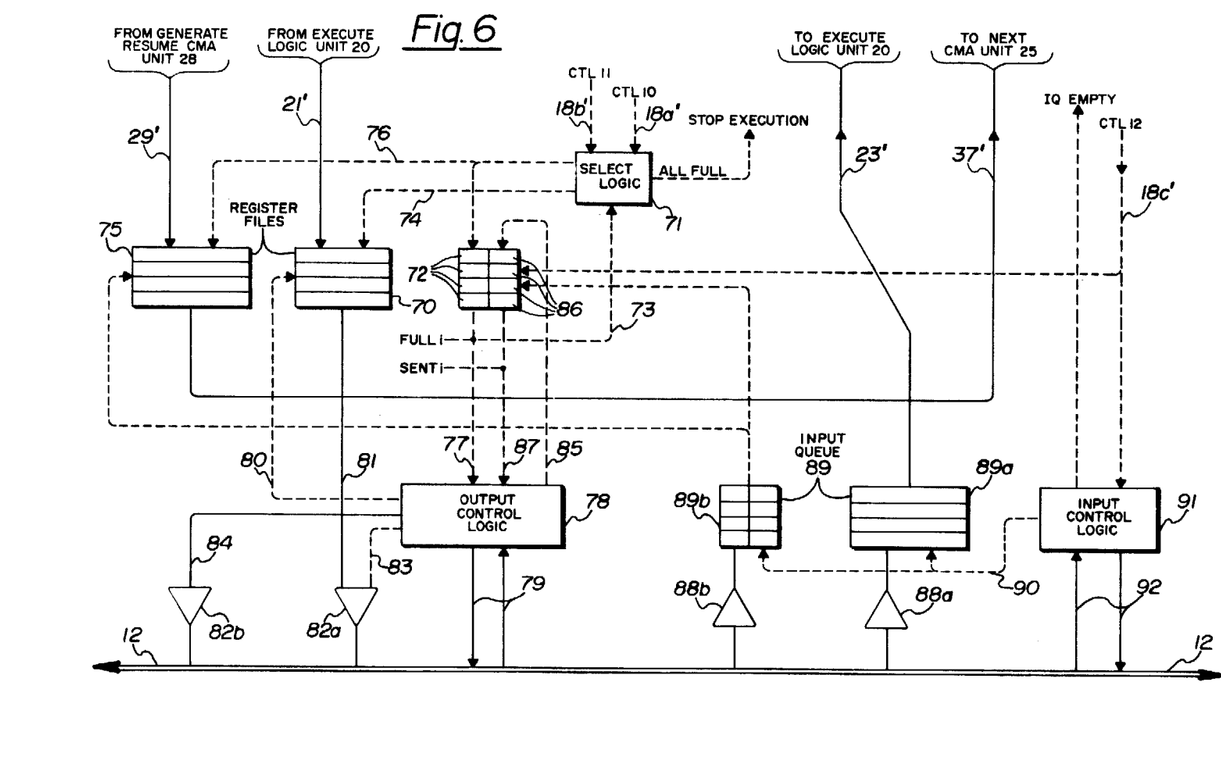
FIG. 6 illustrates the details of one other preferred embodiment of the invention.

Turning now to FIG. 6, the details of another preferred embodiment of the invention will be described. This embodiment differs from the FIG. 1 embodiment in the mechanisms which send messages to and receive messages from the bus. Only these differing mechanisms are illustrated in FIG. 6; and their interconnections to the remainder in the FIG. 1 embodiment which stays unchanged are indicated by primed reference numerals.

For example, output messages are sent from execute logic unit 20 on lines 21'; and resume addresses corresponding to those output messages are sent from logic unit 28 on lines 29'. Similarly, response messages are received by execute logic unit 20 on lines 23'; resume addresses corresponding to those response messages are received by the next address logic unit 25 on lines 37'; and control signals come from register 15 on lines 18'.

Now the operation of the FIG. 6 embodiment is as follows. To begin, each output message on lines 21' is loaded into one of four registers 70. This loading occurs in response to a control signal CTL10 on line 18a'. That signal is sent to a register select logic unit 71 which operates to select one of the four registers 70.

To perform this selection operation, four flip-flops 72 are provided; and their outputs are sent to logic unit 71 on lines 73. These flip-flops indicate which of the registers 70 are full. That is, the output of the first flip-flop is a signal $FULL_1$ indicating the first of the registers 70 is full; the output of the second flip-flop is a signal $FULL_2$ indicating the second of the registers 70 is full; etc. Logic unit 71 then utilizes these $FULL_i$ signals in conjunction with signal CTL10 to generate signals on lines 74 which load the output message on lines 21 into one of the empty registers 70.

Similarly, a set of four registers 75 is provided for holding the resume address that is generated on lines 29'. Clocking signals for loading these registers are provided on lines 76 by logic unit 71. These signals are generated by logic unit 71 in response to the FULL$_i$ signals on lines 73 and a control signal CTL11 on line 18b'.

Also, the signals on lines 76 set one of the flip-flops 72. This indicates that the corresponding registers for storing the output message and resume address are full; and thus an output message is ready to be sent. This condition is sensed on lines 77 by an output control logic unit 78 which then operates to obtain the use of bus 12 by sending and receiving appropriate signals on lines 79.

As the bus request is being made, logic unit 78 also sends a signal on line 80 which gates one of the full registers 70 onto lines 81. Then when the bus is obtained, the output signals on lines 81 pass through transmitters 82 and onto bus 12 in response to a gating signal from unit 78 on a line 83.

But logic unit 78 does not gate the resume control memory address onto bus 12. Instead, it generates signals on leads 84 indicating one of the registers 75 in which the resume control memory address is stored. For example, if the resume address is stored in a first one of the registers 75, then a 00 is generated on lines 84; if the resume address is stored in a second one of the registers 75, then a 01 is generated on lines 84; etc. Those signals on lines 84 are then sent through transmitters 82b to bus 12 along with the output message.

After the output message and signals on lines 84 are sent, the output control logic unit 78 generates signals on leads 85 which set one of four other flip-flops 86. These flip-flops indicate which of the full registers 70 and 75 have been sent as output messages. For example, a SENT$_1$ signal from the first flip-flop 86 indicates that the first registers 70 and 75 have been sent. These SENT$_i$ signals are received by logic unit 78 on leads 87 to prohibit it from sending the same message twice.

Messages sent on bus 12 are received by logic units 11-1 through 11-N as was previously described. And if the output message calls for a response message, then those units send the code that was sent to them on lines 84 along with the corresponding response message. That code in the FIG. 6 embodiment passes through receivers 88b while the response message passes through receivers 88a.

An input queue 89 is provided to store signals from the receivers 88a and 88b. Queue portion 89a stores the messages from receivers 88a; and queue portion 89b stores the corresponding codes from receivers 88b. This loading of the input queue is performed in response to control signals on a lead 90 which is generated by an input control unit 91; and that unit operates in response to control signals on lines 92 from bus 12.

Input messages from queue 89a are sent to the execute logic unit 20 on lines 23'. But the resume control memory address does not come directly from the input queue. Instead, the encoded signals in queue 89b select one of the registers 75; and the output of that selected register is gated onto lines 37' which then go to the next CMA logic unit 25.

Logic unit 25 then utilizes the resume control memory address on lines 37' to jump directly to the first control word that will operate on the output message on lines 23' as was previously described in conjunction with FIG. 2. Thereafter, one of the control words generates a control signal CTL12 on a line 18c' to direct the input logic to move another input message to the output of queue 89.

Signal CTL12 also is sent to the flip-flops 72 and 86. There, that signal in conjunction with the output of queue 86b resets one of the flip-flops 72 and one of the flip-flops 86. This allows a new output message and resume address to be loaded into the registers corresponding to those flip-flops.

One attractive feature of this FIG. 6 embodiment is that the number of inputs and outputs to bus 12 is substantially reduced. This is an important consideration when the embodiment is packaged on a single semiconductor chip. In that case, the number of signal pins on the chip may be a limiting factor; and in the FIG. 6 embodiment, the number of signal pins is reduced because the resume address is not sent directly to or received directly from bus 12.

This reduction in signal pins is substantial where the control memory is relatively large; and thus a large number of bits are needed to form the control memory address. For example, as illustrated in FIG. 6, the length of the register 75 which holds the resume address may be longer than the length of the output messages in register 70.

Figure 7:
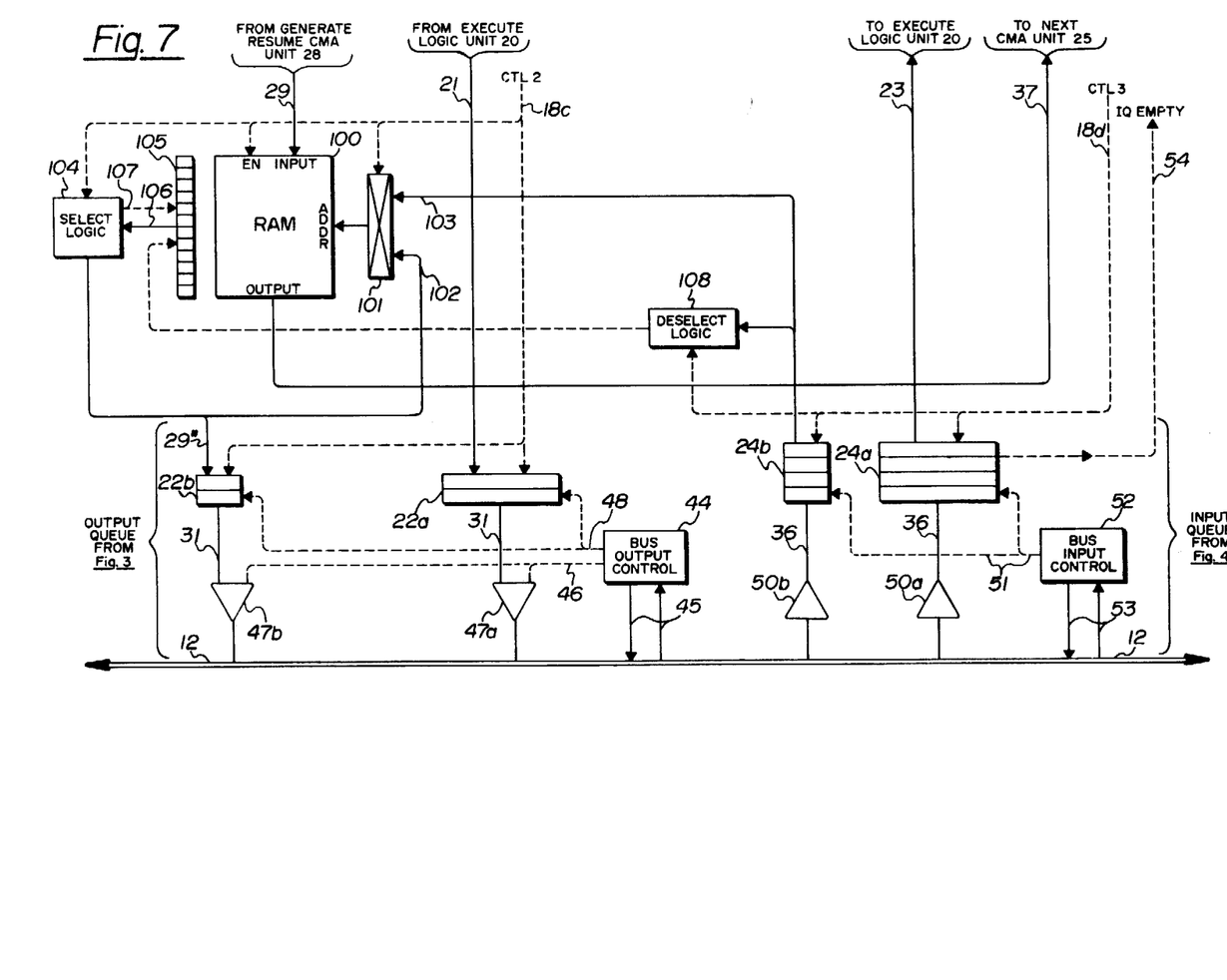
FIG. 7 illustrates the details of still another preferred embodiment of the invention.

Turning now to FIG. 7, the details of still another preferred embodiment of the invention will be described. This embodiment, in general, is a hybrid of the embodiments of FIGS. 1 and 6. In particular, the FIG. 7 embodiment utilizes output queue 22 and input queue 24 of FIG. 1 to respectively send and receive messages from bus 12; but control signals which represent the resume address, rather than the resume address itself, are loaded into output queue 22b.

Those control signals which represent the resume address are then sent to external devices 10-1 through 10-N; and they are returned by those devices along with the response message. Input queue 22a receives the response message while input queue 22b receives the returned control signals. And from the returned control signals, the resume address itself is regenerated in a manner which is similar to but not the same as that which occurred in the FIG. 6 embodiment.

Now the detailed operation of the FIG. 7 embodiment is as follows. To begin, an output message which calls for a response message is loaded into output queue 22a in response to control signal CTL2 on lead 18c. In addition, the resume address for that output message is loaded from leads 29 into a random access memory (RAM) 100. This loading also occurs in response to control signal CTL2.

RAM 100 is addressed by a 2×1 multiplexer 101. That multiplexer receives one set of address signals on leads 102 and another set of address signals on leads 103. Those address signals on leads 102 are passed through multiplexer 101 whenever control signal CTL2 is true; and address signals on leads 103 are passed through multiplexer 101 whenever control signal CTL2 is false.

Address signals on leads 102 are formed by a selection logic unit 104 and a plurality of flip-flops 105. One flip-flop is provided for each addressable storage location in memory 100. These flip-flops generate FULL$_i$ signals on leads 106 indicating which storage locations in RAM 100 are full and which are empty; and select logic unit 104 operates in response to these FULL$_i$ signals to generate on leads 102 that address of RAM 100 where the resume address should be stored.

That address on leads 102 not only addresses RAM 100, but it also is loaded into output queue 22b in response to control signal CTL2. Then, after the resume address has been stored in RAM 100, unit 104 generates a signal on leads 106 to set the one flip-flop in the plurality 105 which corresponds to the RAM location that was just loaded with the resume address.

Output queue 22 then has its output sent over bus 12 to one of the external devices 11-1 through 11-N. And thereafter, input queue 24 receives from those external devices, the called for response message and corresponding content of output queue 22b. Details of this wrapping operation were previously described in conjunction with FIGS. 3 and 4, and thus it need not be repeated here.

Response messages in input queue 24a are received by logic unit 20 on leads 23. And resume addresses corresponding to those response messages are regenerated from the content of queue 24b in the following manner. Input queue 24b has its output sent over leads 103 through multiplexer 101 and to the address input of RAM 100. And the addressed storage location in RAM 100 contains the desired resume address.

The resume address is regenerated on leads 37. Those leads then couple to control unit 25, which utilizes the resume address to generate the next control memory address as was described in conjunction with FIG. 5. Then, after the resume address on leads 37 has been utilized, control signal CTL3 on lead 18d becomes active; and that signal enables a new response message to be moved to the output of input queue 24. Signal CTL3 is also sent to a deselect logic unit 108 which operates in response to that signal to reset one of the flip-flops 105 which corresponds to the address signals on leads 103 which were just used to address the RAM.

One attractive feature of this FIG. 7 embodiment is that the size of output queue 22 is independent of the size of RAM 100. Thus, the number of storage locations in the output queue 22 can be tailored to handle the average traffic on bus 12; whereas the number of storage locations in RAM 100 can be tailored to handle the number of tasks which it is desired to simultaneously multiplex. This latter consideration is dependent on the time that it takes external devices 11-1 through 11-N to form response messages, and that time is independent of bus traffic.

Various preferred embodiments of the invention have now been described in detail. In addition, however, many changes and modifications may be made to those details without departing from the nature and spirit of the invention. For example, the FIGS. 1, 6, and 7 embodiments may have their transmitter outputs and receiver inputs connected together in a bi-directional fashion to further reduce the number of signal pins.

Also as another modification, the FIGS. 1, 6, and 7 embodiments may send various machine state control signals along with the resume address on their lines 29 and 29'. These state control signals may include, for example, the carry-out from an adder in the execute logic unit 20 and the conditions which are tested on the lines 27. these state control signals are then wrapped back to the input queue in the same fashion as the resume address; and they are re-stored in the device when the resume address is loaded by the next control memory address logic unit 25 back into control memory address register 14.

Also, as still another modification, the resume control memory address may be sent in any encoded fashion to the logic units 11-1 through 11-N and from there sent back to the device 10 whereupon it is decoded. In other words, only control signals representative of the resume address, which may or may not be the resume address itself, need be sent with the output messages and received with the corresponding response messages.

Accordingly, since many modifications and changes may be made to the above-described details, it is to be understood that the invention is not limited to said details but is defined by the appended claims.

What is claimed is:

1. A digital device for time multiplexing the execution of multiple tasks, each of said tasks being defined by a sequence of control words in a control memory in said device, at least one control word in each sequence causing an output message to be sent on output lines in said device, said at least one output message calling for a response message to be received on input lines in said device; wherein the improvement comprises:

means for sending control signals representative of respective resume addresses along with each of said output messages that are sent on said output lines;

means for suspending the execution of each task for which a said resume address is sent and for executing another task in lieu thereof;

means for receiving on said input lines said response messages that are called for by said sent output messages along with said corresponding respective control signals; and means for resuming the execution of a previously suspended task following the receipt of a response message by executing control words in said control memory beginning at the resume address that is represented by the received control signals.

2. A digital device according to claim 1 wherein said resume addresses are in bit form, and said control signals as sent by said means for sending fewer bits than said resume addresses.

3. A digital device according to claim 2 and further including storage means for storing the resume addresses that are represented by the control signals sent on said output lines, and addressing means for reading from said storage means the stored resume addresses that are represented by the control signals received on the input lines, said means for resuming including means for resuming previously suspended tasks at the resume addresses that are read from said storage means.

4. A digital device according to claim 2 which further includes means containing state bits that indicate a predetermined state of the device, a storage means for storing said state bits along with the resume addresses that are represented by the control signals sent on said output lines, and addressing means for reading from said storage means the stored state bits along with the stored resume addresses that are represented by the control signals received on the input lines; said means for resuming including means for resuming previously suspended tasks using the state bits and resume addresses that are read from said storage means.

5. A digital device according to claim 1 wherein said means for receiving includes means for also receiving messages from any source coupled to said input lines which messages are not responses to said output messages; and wherein said device further includes means for distinguishing said nonresponse messages from said response messages, and means for operating on said received nonresponse messages by executing control words in said control memory beginning at a predetermined address.

6. A digital device according to claim 1 wherein said means for sending includes a means for queuing said output messages and respective control signals before they are sent on said output lines.

7. A digital device according to claim 1 wherein said means for receiving includes a means for queuing said response messages and respective control signals following their receipt on said input lines.

8. A digital system including first and second digital devices; said first device having means for sending to said second device output messages calling for respective response messages; and said second device having means for sending to said first device said response messages as well as unsolicited nonresponse messages; wherein the improvement comprises:
  input means in said first device for receiving said response messages and said nonresponse messages in any sequence as well as for receiving control signals from said second device along with said response messages with said control signals being representative of respective resume addresses; and
  control means in said first device for operating on said nonresponse messages by executing control words in a control memory beginning at a fixed address as well as for operating on said response messages by executing control words in said control memory beginning at said respective resume addresses represented by said control signals.

9. A digital system including first and second digital devices, said first device having a control memory for storing control words which direct the operation of said first deivce; the improvement comprising:
  sending means in said first device for sending an output message along with control signals to said second device with said control signals being representative of a resume address and said output message calling for a response message;
  sending means in said second device for sending said called for response message to said first device along with said control signals; and
  executing means in said first device for executing control words from said control memory to operate on said response message beginning at the resume address represented by said control signals from said sending means.

10. A digital device having input lines, output lines, and a control memory; the improvement comprising:
  means for sending control signals representative of a resume address along with an output message on said output lines with said output message calling for a response message;
  means for receiving said called for response message on said input lines along with said sent control signals; and
  means for executing control words in said control memory beginning at the resume address represented by said received control signals which control words operate on said received response message.

* * * * *